Figure 1:
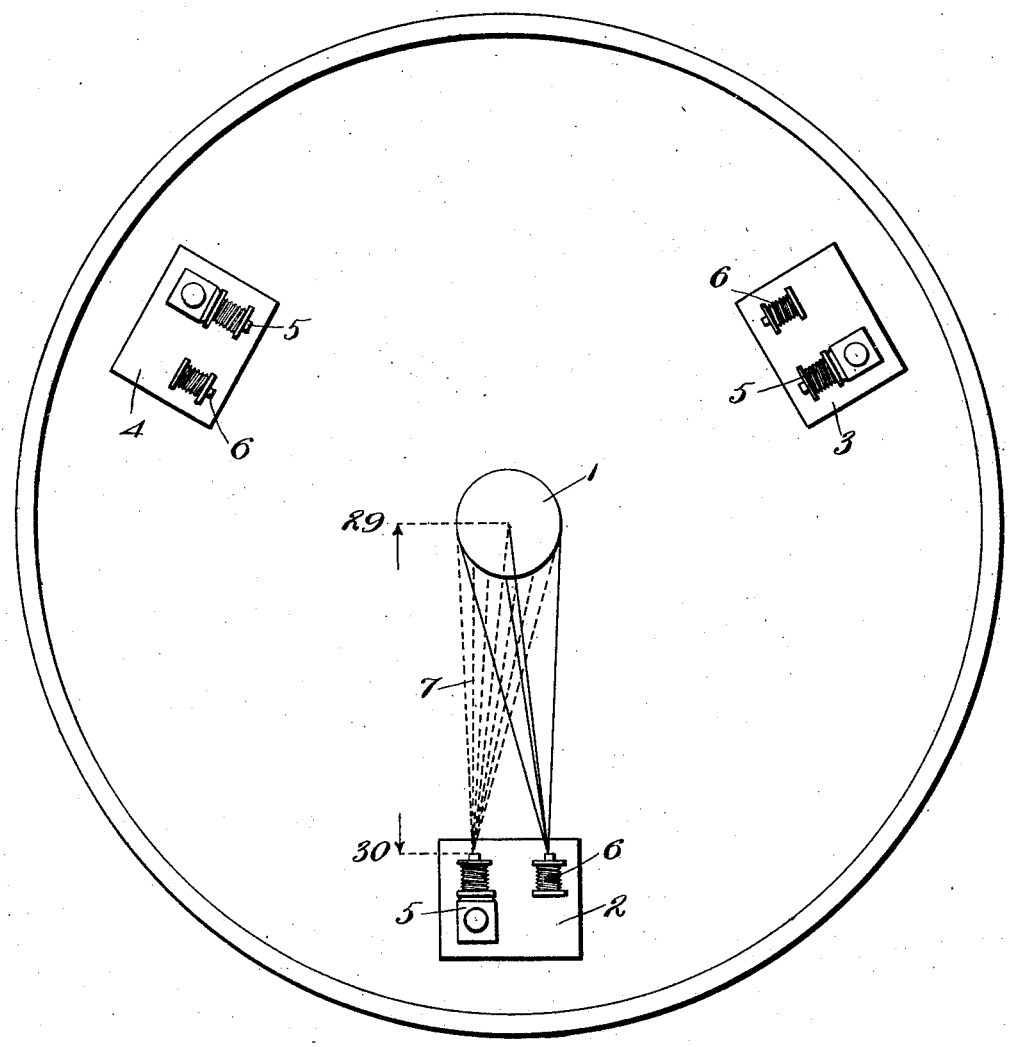

V. STORTI.
APPARATUS FOR REPRODUCING THE FORMS OF BODIES.
APPLICATION FILED DEC. 28, 1909.

991,386.

Patented May 2, 1911.
3 SHEETS—SHEET 1.

Witnesses
Byron B. Collings
G. H. Dunston

Inventor
Vittorio Storti by
Wickinson Fisher
& Wickinson
Attorneys

V. STORTI.
APPARATUS FOR REPRODUCING THE FORMS OF BODIES.
APPLICATION FILED DEC. 28, 1909.
991,386.
Patented May 2, 1911.
3 SHEETS—SHEET 2.
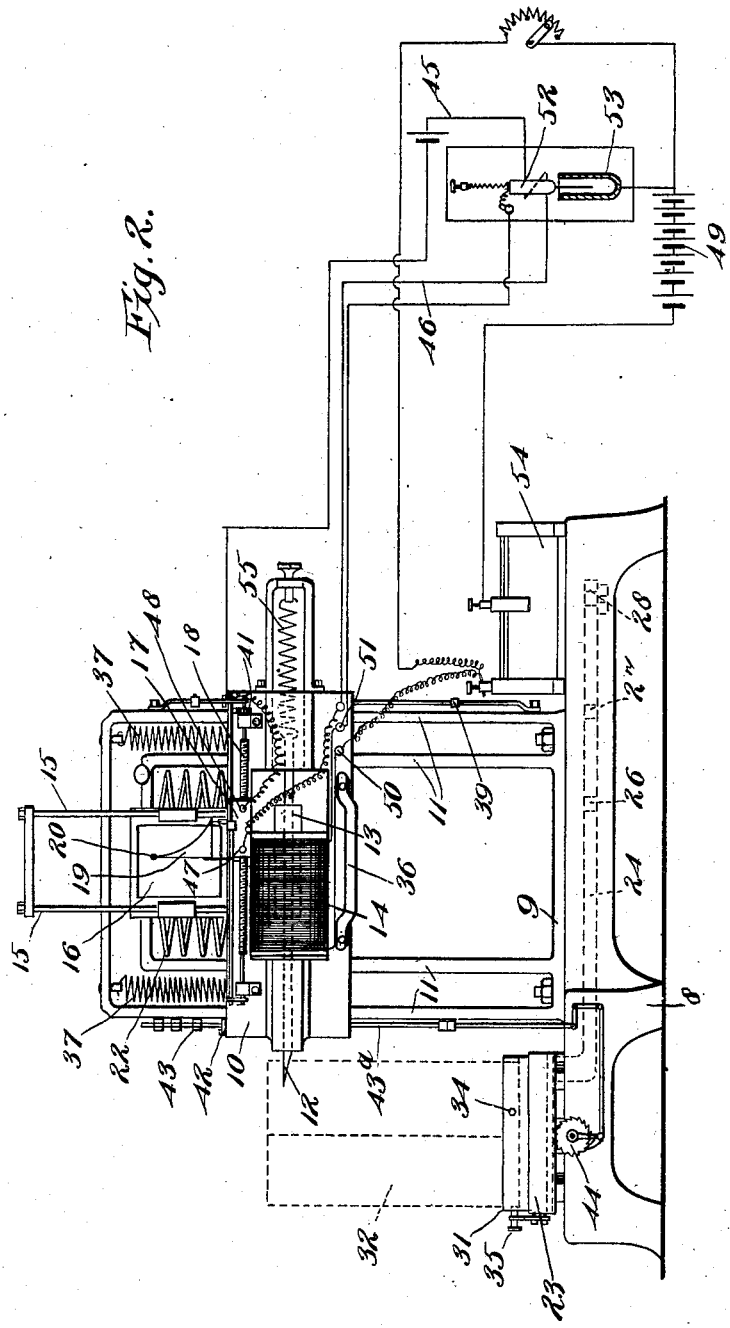

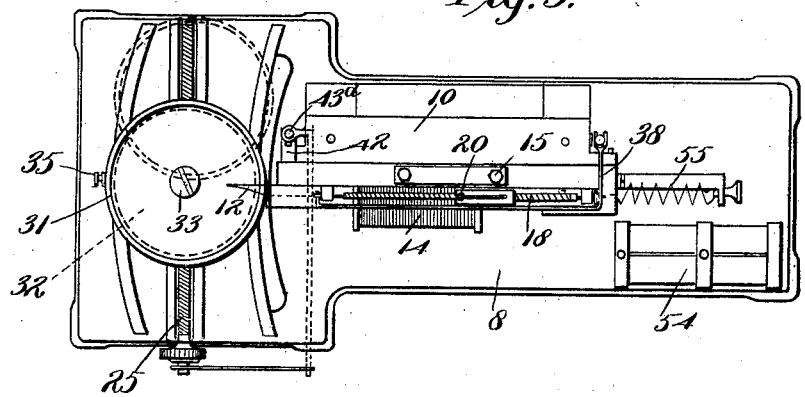
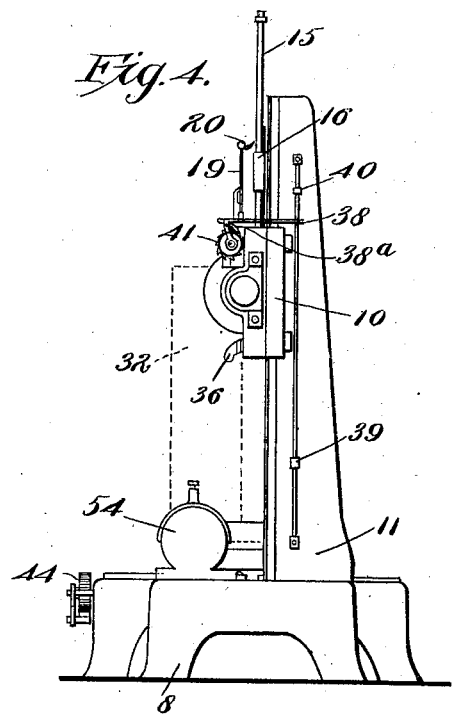
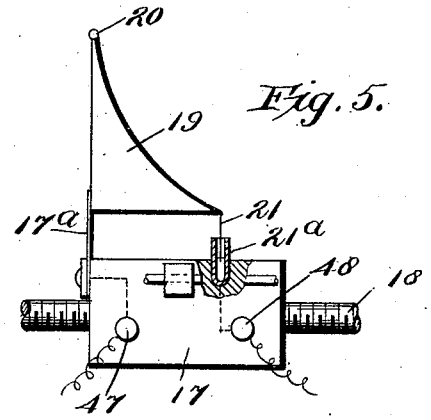
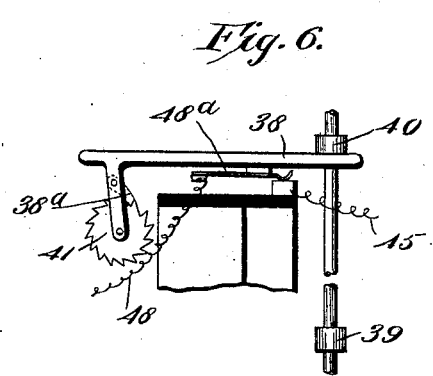

UNITED STATES PATENT OFFICE.

VITTORIO STORTI, OF MILAN, ITALY.

APPARATUS FOR REPRODUCING THE FORMS OF BODIES.

991,386. Specification of Letters Patent. Patented May 2, 1911.

Application filed December 28, 1909. Serial No. 535,328.

*To all whom it may concern:*

Be it known that I, VITTORIO STORTI, manufacturer, a subject of the King of Italy, residing at Via Castel Morone No. 16, Milan, Italy, have invented certain new and useful Improvements in Apparatus for Reproducing the Forms of Bodies; and I do hereby declare the following to be a full, clear, and exact description of the invention, such as will enable others skilled in the art to which it appertains to make and use the same.

This invention relates to an apparatus for the reproduction of the forms of bodies by photographing the profiles represented by way of example in the accompanying drawing in which:

Figure 1 is a diagram showing the arrangement that may be adopted for the photographic apparatus intended for taking the profiles. Fig. 2 is a front elevation of the apparatus which reproduces the profiles. Fig. 3 is a plan view. Fig. 4 is an end elevation of this same apparatus. Fig. 5 is a detail view of the movable system; and Fig. 6 shows in detail the means for operating the movable system.

In order to take a photograph the object or the person whose form is to be reproduced is placed in a feebly lighted chamber or preferably in a camera obscura in the position indicated by 1 around which there are arranged symmetrically three groups 2, 3, 4 of apparatus each composed of a projection lantern 5 and a photographic machine 6. In the lantern the ordinary positive plate is replaced by a piece of glass engraved with vertically arranged parallel lines to the number of about 60 per cm. By releasing in succession the shutters of the three groups a given number of lines or rays 7 bright and obscure will fall upon the object to be copied in following its forms in such a manner that the photographic apparatus 6 will reproduce profiles upon the plane of the plate; these profiles will present a different ratio to the object itself according to the angle that the projecting rays and the reflected rays form one with the other. When the three negatives have been developed and retouched in such a manner that the upper extremities of the profiles occupy the correct position, that is to say when all the profiles have been prolonged to the same horizontal at an equal interval one from the other there is no difficulty in obtaining from these negatives, positives presenting hollow profiles resulting from the bright lines and the operation may be effected by the usual bichromate of gelatin method. At this point the plates are ready for the second phase of the process that is to say for the reproduction of the profiles obtained from the said plates by the improved apparatus.

This apparatus is broadly constituted by the base of cast iron 8 upon which the upright frame 9 is fixed.

A bronze carriage 10 sliding vertically on the guides 11 carries between two channels the knife 12 fixed to the core of soft iron 13 which may be attracted by the solenoid 14; the guides 15 are integral with this carriage 10; they are suitably fixed and along them the small plate holder 16 is able to slide.

The movable system 17 consists of a slate parallelepiped which can be displaced longitudinally by the screw 18; by means of a small flexible blade 17ª it supports a small metal angle piece 19 which at the upper extremity carries the tracing point 20 and on the right hand the platinum filament 21 immersed in a small capillary tube 21ª containing mercury.

The system of levers 22 serves to impart an alternating movement to the small plate holder 16. Upon the cast iron base 8 the metal disk 23 fixed to the lever arm 24 and controlled by the screw 25 is able to describe an arc of a circle having its center at 26 or at 27 or at 28; the length of this lever 24 should be proportionate to the distance 29—30 between the center of the objective of a projection lantern 5 and the object to be reproduced which is situated at 1.

The disk 31 provided with a flange to enable it to contain the block of plastic wax 32 is pivoted upon the axis of the screw 33 and it is able to describe an arc having the amplitude of a third of a circumference in presenting the three holes 34 formed in the edge one after the other to the stud 35 which serves as a stop.

When the plate with the hollow profiles has been mounted on the frame 16 the system 17 is arranged in such a manner that the tracing point 20 is situated to the left hand of the plate. The disk 31 should be arranged in such a manner that the wax block 32 hardly touches the knife 12 as shown in Fig. 3; then by means of the handle 36 a downward rectilinear reciprocating movement is imparted to the carriage 10 which is returned by means of counter-springs 37.

A forked lever 38 pivoted on the ends of the screw 18 and carrying a pawl 38ª adapted to engage a toothed wheel 41 fixed on the screw 18 in encountering the stop collar 39 in the descent lifts the tracing point 20 from the plate in such a manner that the fork and with it this tracing point are able to ascend without the latter touching the plate. When it reaches the end of its upward movement the fork 38 in encountering the stop collar 40 again descends, this movement causing the toothed wheel 41 to rotate and the entire system 17, to advance by one tooth; at the same time said movement also presses the point 20 against the plate.

At the left hand and on the carriage 10 a fork 42 in encountering the stop collars 43 on a rod 43ª presses it upward and causes the toothed wheel 44 by means of a set of levers, as clearly shown in Fig. 2, to advance to the extent of one tooth the block of wax 32. During the downward travel of the carriage 10 the plate holder 16 rises upon the guides 15 under the influence of the operating of the system of levers 22 to which it is fixed and the tracing point 20 in encountering a hollow profile is obliged to follow its undulations. These movements also transmitted to the platinum filament 21 cause it to enter the small capillary tube arranged below to a greater or less extent thereby varying the intensity of the current in the circuit 45, 46, 47, 48, 45. As these variations of current cannot be utilized in the solenoid 14 because they are too feeble it is necessary to employ a special intensifier represented diagrammatically at the right hand of Fig. 2. The solenoid 14 inserted in the circuit 49, 50, 51, 53, 49 when the electric current passes will attract the core 13 to a greater or less extent causing the knife 12 to cut from the block 32 a slice of wax proportionate to the amplitude of the oscillations of the tracing point 20. By modifying the resistance of the rheostat 54 the amplitude of the oscillations of the knife 12 can be regulated.

At the end of each travel of the carriage 10 in the downward direction the current in the two circuits referred to above is interrupted by means of an appropriate interrupter such as 48ª; the knife 12 then withdraws in the groove under the influence of the counter-spring 55 and consequently in rising it will not injure the profile already engraved upon the wax.

When the reproduction of the profiles of the first plate has been executed the second is substituted for it and then the third in repeating the operations already described.

Obviously it is necessary to rotate the disk 31 through a third of a circumference for each plate that is changed in successively presenting the three faces of the wax block 32 to the point of the knife 12.

When all the profiles have been reproduced it is necessary to retouch the wax model here and there especially in the parts beneath the angle piece which the knife has been unable to reach. Finally by means of a coarse brush the streaks produced by the successive cuttings are removed and the reproduction in wax is finished.

By suitably modifying the resistance of the circuit 49, 54, 50, 14, 51, 52, 53, 49 by the rheostat 54 models of different sizes may be obtained by the same plate in bas relief or in alto rilievo and likewise caricatures, first sketches or models, and the like.

I claim—

1. In an apparatus of the character described, the combination of a support provided with guides, a movable frame mounted on said guides, a plate holder carried by said frame and adapted to support the plate, a pointer adapted to contact with the plate in the plate holder when the frame is moved in one direction, an electric circuit in which said pointer is included, the movements of said pointer varying the resistance of said circuit, stops on said support, a screw revolubly mounted on said frame, a nut engaging said screw and carrying said pointer, devices operated by said stops to rotate said screw one step of a revolution on each back and forth movement of said frame, and engraving devices carried by said frame, including a knife, a solenoid controlling the movement of said knife, and a second electric circuit containing said solenoid and controlled by the varying resistance in said first named circuit, substantially as described.

2. In an apparatus of the character described, the combination of a support, a movable frame mounted on said support, a plate holder mounted on said frame and adapted to carry a plate, engraving devices carried by said plate, including a solenoid and a knife operated thereby, a pointer adapted to engage with the plate in the plate holder as the latter is moved downward, an electric circuit in which said pointer is connected, a second electric circuit in which said solenoid is connected, and controlled by said first named electric circuit, a support carrying a wax cylinder engaged by said knife, and devices operated by the reciprocation of said frame to move said wax cylinder by a step by step movement, substantially as described.

3. In an apparatus of the character described, the combination of a support provided with guides, a movable frame mounted on said guides, a plate-holder supported by said frame and carrying a plate, a pointer adapted to contact with said plate, devices for holding the pointer in contact with said plate when the frame is moved in one direction and for holding it out of contact therewith during the reverse movement, an electric circuit in which said pointer is included, a second electric circuit controlled by said first electric circuit, a solenoid in the second circuit, a knife operated by said solenoid, a disk carrying a wax cylinder adapted to be engaged by said knife, and means operated by the movement of the frame to move said wax cylinder in the arc of a circle, substantially as described.

4. In an apparatus of the character described, the combination of a support provided with guides, a movable frame mounted on said guides, a plate-holder supported by said frame and carrying the plate, a screw rotatably mounted on the frame, a carriage carried by the screw, a pointer supported by the carriage and adapted to contact with the plate in the plate-holder, a toothed wheel fixed to the screw, a lever pivotally connected to the screw and carrying a pawl, stops arranged on the support for rotating the screw to reciprocate the carriage and hold the pointer in contact with said plate when the frame is moving in one direction and for holding it out of contact therewith during the return movement, an electric circuit in which the pointer is included, a second electric circuit controlled by said first electric circuit, a solenoid in the second circuit, a knife operated by said solenoid, a disk carrying a wax cylinder adapted to be engaged by said knife, means for adjusting the wax cylinder on the disk, and means operated by the movement of the frame to move said wax cylinder in the arc of a circle by a step by step movement, substantially as described.

In testimony whereof, I have affixed my signature, in presence of two witnesses.

VITTORIO STORTI.

Witnesses:
CHAS. H. FISCHER,
JAMES B. YOUNG.

---

Copies of this patent may be obtained for five cents each, by addressing the "Commissioner of Patents, Washington, D. C."